United States Patent [19]

Bell et al.

[11] Patent Number: 5,026,967
[45] Date of Patent: Jun. 25, 1991

[54] VISION ENHANCED METHOD FOR MAKING A FULL ROUND BUSHING

[75] Inventors: Bruce A. Bell, Marietta, Ohio; Donald G. Landis, Hollis, N.H.

[73] Assignee: JPI Transportation Products, Inc., Ann Arbor, Mich.

[21] Appl. No.: 550,084

[22] Filed: Jul. 9, 1990

[51] Int. Cl.⁵ .............................................. B23K 26/00
[52] U.S. Cl. ................................. 219/121.64; 219/118; 219/121.63; 219/121.78
[58] Field of Search .................... 219/121, 63, 121.64, 219/118, 121.78, 121.79, 121.75, 121.85; 29/149.5 R

[56] References Cited

U.S. PATENT DOCUMENTS

| | | | |
|---|---|---|---|
| 4,156,123 | 5/1979 | Fischer et al. | 219/121.14 |
| 4,176,270 | 11/1979 | Sailas | 219/121.14 |
| 4,433,230 | 2/1984 | Sano et al. | 219/118 |
| 4,527,040 | 7/1985 | Moon et al. | 219/118 X |
| 4,628,178 | 12/1986 | Miyake et al. | 219/118 X |
| 4,751,777 | 6/1988 | Savel, III | 29/149.5 R |

Primary Examiner—C. L. Albritton
Attorney, Agent, or Firm—Harness, Dickey & Pierce

[57] ABSTRACT

A full round bushing is formed by laser welding opposed edges of a bimetal member deformed into a generally cylindical configuration. The laser beam parameters are closely controlled so as to limit any adverse affect on a bearing metal layer. The weld only reaches a depth approximately 20% to 75% of a steel reinforcing layer. The beam approaches the seam between opposed edges at an angle of incidence approximately 10° to 45° and at a laser focal point offset 5% to 70% of the spot diameter of the laser beam. An overlap of the pulse spot-welding approximately 50% to 75% is preferable. A machine vision control system is used to locate the seam, moving the bushing to position the seam as desired relative to the laser and to trigger the laser to perform the welding operation.

21 Claims, 4 Drawing Sheets

VISION ENHANCED METHOD FOR MAKING A FULL ROUND BUSHING

BACKGROUND OF THE INVENTION

This invention pertains to the art of bushings and more particularly to clinch free cam bushings. The invention is applicable to a method of making full round bushings and will be described with particular reference thereto and is particularly related to a vision enhanced method of making bushings.

Typically, full round bushings have been produced by one of the following standard methods. According to a first method, a strip of bimetal material is formed into a round, generally cylindrical shape in which opposed edges of the material are joined or interlocked by clinching. The clinched edges resemble the interlocking pattern of a dovetail or cooperating puzzle pieces. Generally, a wide range of bearing metal alloys can be used with an outer steel layer which also makes clinched design bushings attractive from a manufacturing standpoint. Clinched design bushings have met with commercial success when used in high volume since manufacturers have automated machinery for supporting a workpiece during various machining steps. Such a design requires extensive fixturing and precise assembly control. In those applications where fixturing is not readily available, the detailed assembly can pose difficult problems. These manufacturing requirements do not make it economical or practical for low or moderate volume bushing production runs.

Other drawbacks are associated with the clinched design. For example, the clinched seam can become loose or distorted during installation which, in turn, causes the bushing to be out-of-round and unusable for its intended purpose.

A second standard method of producing full round bushings is an enhancement of the first. In this method the strip forming bushing seam is welded using electron beam T.I.G., M.I.G., submerged arc, or other standard welding processes. The disadvantages of these processes are cost and resultant quality. The electron beam process must be performed in a full or partial vacuum and is therefore slow and costly. The other processes mentioned are of high heat intensity and can damage the structure of low melting point bearing materials and the bonding of these materials to the steel backing.

A third standard method involves the drawing of a full round product from pre-cast, sintered, or clad bimetallic strip. This method is limited by the types of materials that can be drawn, is slow, and inefficient in the use of material and is, therefore, costly.

A final standard method of producing full round bushings involves use of solid tubing having a bearing material cast along the inside diameter thereof. Bushings are then cut to a desired length from the solid tube and, in this manner, there is no visible joint in the steel or bearing material.

Although these bushings do not have the problems associated with the clinch or other designs produced from strip, other problems are associated with this method of manufacture. For example, these bushings are relatively expensive to produce and limited to an inner diameter bearing material that is compatible with centrifugal casting.

It has thus been deemed desirable to produce a full round bushing that may accommodate a large selection of materials for the bearing alloys and yet is relatively inexpensive to manufacture. Further, the distortion and loosening problems associated with the clinch design are preferably to be avoided.

SUMMARY OF THE INVENTION

According to the subject invention, an economical method of forming a full round bushing that is adaptable to a wide selection of bearing materials and of reliable quality is provided. The method includes the steps of supplying a generally cylindrical member having opposed edges disposed in spaced, generally facing relation along a longitudinal length thereof. The cylindrical member has first and second different metal layers, in which one of the layers defines a bearing surface. Laser welding of opposed edges forms an integral structure.

The laser welding is limited to the non-bearing metal layer so that the bearing metal is not degraded. The extent of welding is limited to a predetermined depth of the non-bearing metal layer. A depth of approximately 20% to 75% of the radial thickness of the non-bearing metal layer is preferred and a depth of 50% of the radial thickness is considered ideal.

The welding step includes disposing a laser beam at an angle to a radial plane defined between the opposed edges of the material. An angular range approximating 10% to 45% is preferable, and ideally, an angle approximating 20° to 25° to the radial plane defined between these edges.

During the welding step, the focal point of the laser beam is offset from one edge a dimension approximating 5% to 70% of a spot diameter of the laser beam. Ideally, the focal point offset approximates 10% to 30% of the spot diameter.

The welding is specifically a spot-welding process in which individual spots are overlapped. Ideally, these spots are overlapped approximately 50% to 70%.

According to a principal objective of the subject invention, a machine vision system is used to control the method. The vision system improves upon the method of making full round bushings as described in U.S. Pat. No. 4,751,777, issued June 21, 1988 and incorporated herein by reference. The vision system is utilized to precisely position the opposing edges of the bushing relative to the laser beam.

A primary advantage of the machine vision enhanced method is the precision and uniformity attainable in the manufacture of a full round bushing.

A further advantage of the subject invention is the economical manufacture of a full round bushing.

Yet another advantage of the invention is realized in the wide range of materials that can be used for the bearing surface.

Still another advantage of the subject invention is found in the reliable joint formed between opposed edges of the bushing.

Still other advantages and benefits of the invention will become apparent to those skilled in the art upon a reading and understanding of the following detailed description.

BRIEF DESCRIPTION OF THE DRAWINGS

The subject invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
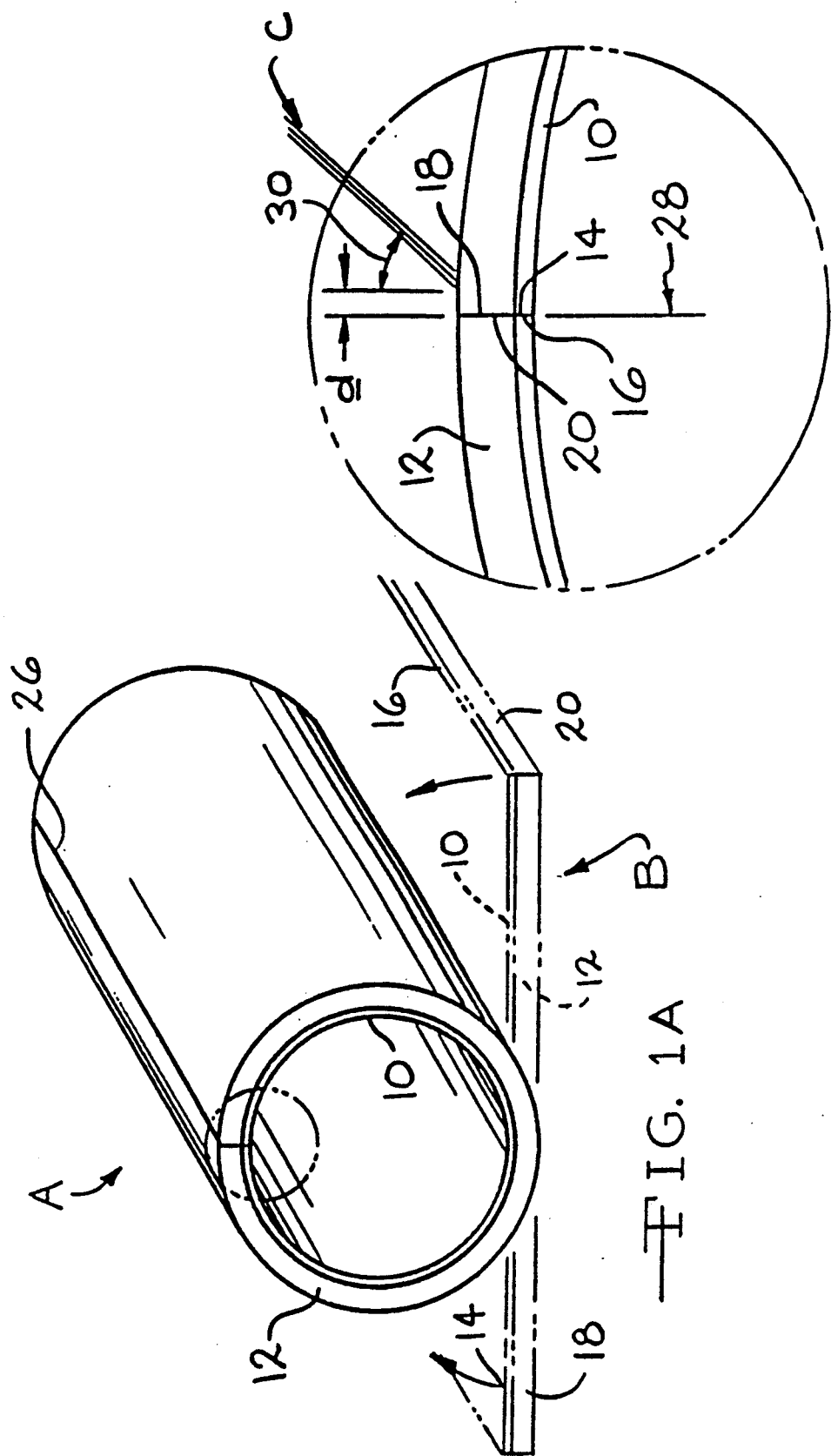
FIG. 1A is a perspective view of a bushing having a laser welded joint formed in accordance with the teachings of the subject invention.
FIG. 1B is an enlarged, detailed end view of the encircled portion of FIG. 1A.
Figure 2:
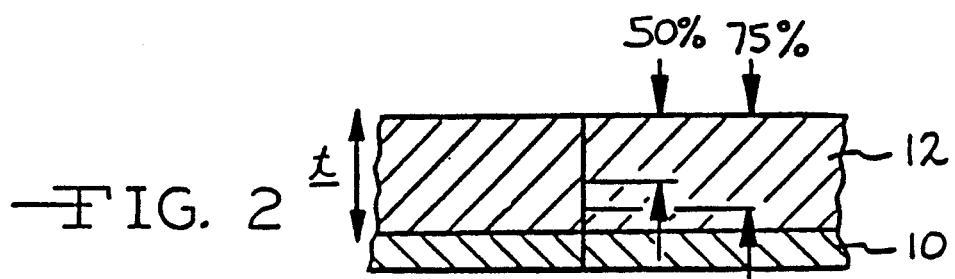
FIG. 2 is a detailed end view schematically illustrating the depth of penetration of the laser weld.

Referring now to the drawings wherein the showings are for purposes of illustrating the preferred embodiment of the invention only and not for purposes of limiting same, the FIGURES show a full round bushing A formed from a generally planar bimetal member B. The bimetal member is deformed into a generally hollow cylindrical configuration through conventional methods. A laser beam C typically of $CO_2$ or YAG type is designed to weld closely-spaced, opposed edges of the bimetal member and interlock these opposed edges to form a full round bushing.

More specifically, and with reference to FIGS. 1A and 1B, the bimetal member B includes a first layer 10 comprising a bearing metal of preselected alloy composition such as tin/lead based babbits, aluminum bearing alloys, cooper-lead-tin alloys, etc. This layer is designed to provide a lubricated surface designed for sliding fit with a journal or other machine element as is known in the art. A second layer 12 defines a reinforcing metal, commonly of steel composition. According to known methods of manufacture, the first and second layers are secured together to form an integral structure. The bimetal member is deformed into a generally hollow cylindrical configuration in which the bearing metal is disposed along an inner peripheral portion. The reinforcing metal layer is thereby disposed along the outer periphery. Opposed edges 14, 16 of the bearing metal, as well as opposed edges 18, 20 of the reinforcing metal layer, are positioned in facing relation before welding. The opposed edge pairs are closely spaced along a longitudinal length 26 of the bushing.

As indicated above, the opposed edges may have been clinched together in prior art constructions. According to the subject invention, the opposed edges of the non-bearing metal or steel layer are laser welded. In this manner, a reliable joint is achieved without adverse effect on the bearing metal layer.

FIG. 1B illustrates the critical parameters utilized in laser welding the bushing. It is necessary to position the laser beam relative to the opposed edges in a manner that will have no adverse effect on the bearing metal layer. A radial plane 28 is generally defined between the opposed edge pairs. The laser beam angle of incidence 30 is defined relative to this radial plane. Further, a focal point of the laser beam C is offset from the radial plane a distance d.

With continued reference to FIG. 1B, and additional reference to FIGS. 2-6, the critical parameters employed in the welding process will be described with greater particularity. The laser welding is essentially limited to the reinforcing or steel layer 12 of the cylindrical configuration. The heat developed during welding can easily degrade various bearing alloys due to their low melting point. Since the steel layer requires the intense heat developed by a concentrated laser beam in order to fuse the opposed edges 18, 20 together, it is vital that the laser beam be isolated from the bearing metal.

In the preferred embodiment, the steel reinforcing layer 12 is disposed along the outer peripheral portion. the precise depth of the weld is carefully controlled through regulation of the intensity of the laser beam as well as the welding speed along the generally longitudinal length 26 of the bushing. That is, the power required for fusion with a laser beam is a function of thickness of the steel and speed of welding. Preferably, the depth of the weld ranges between approximately 20% to 75% of the radial thickness t of the steel layer 12. Ideally, the laser welding takes place to a depth of approximately 50% of the steel layer thickness. In this manner, the bearing metal layer remains unaffected by this process. The high energy intensity of the laser beam heats only the limited area of steel to the welding temperature and the thermal mass of the bushing itself dissipates the heat quickly so as not to affect the bearing metal layer.

Figure 3:
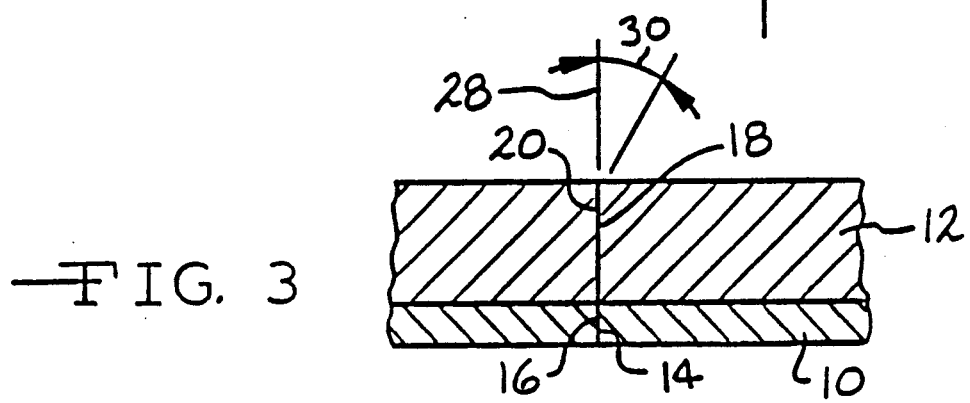
FIG. 3 is a detailed end view schematically illustrating the angular disposition of the laser beam relative to the joint.
Figure 4:
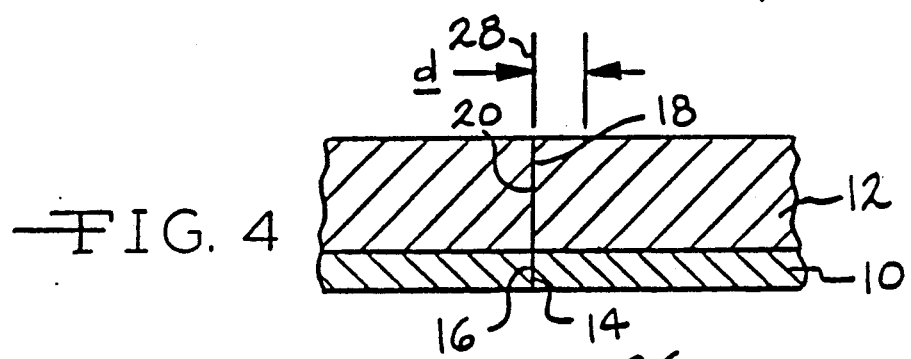
FIG. 4 is a detailed end view schematically showing the focal point offset of the laser beam from the joint.

FIG. 1B and FIG. 3 demonstrate the angle of incidence of the laser beam C relative to the radial plane 28. Preferably, the angle of incidence ranges from approximately 10° to 45° and ideally is defined at about 20° to 25° to this radial plane. The angle of incidence assures that the laser light path never crosses the bearing layer 10 since the angle of incidence is defined by the laser beam arriving at the surface of the steel layer and the angle formed with a perpendicular to that surface at the point of arrival.

As further protection for the bearing layer, and as one means for venting the majority of the vaporizing alloy during welding, the steel or reinforcing layer is welded from one side of the joint. The laser focal point is offset a distance d from the radial plane 28 and measured between the radial plane and the perpendicular defining the angle of incidence. The offset dimension is defined as a function of the laser beam diameter x and preferably ranges between 5% and 70% of this diameter. Best results have been achieved, through, with an offset distance ranging between 10% and 30% of the laser beam diameter.

Figure 5:
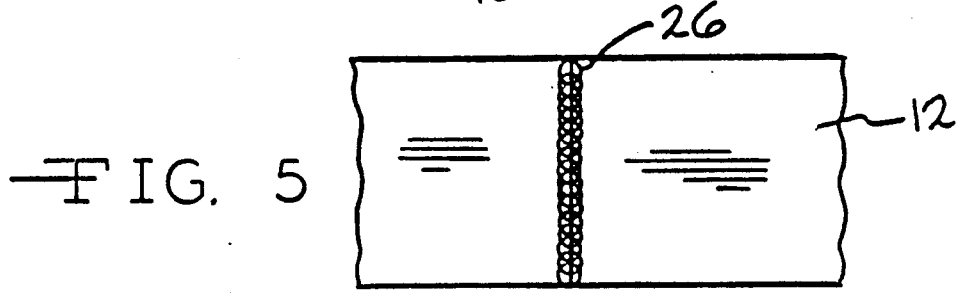
FIG. 5 is a plan view of the laser welded seam formed in accordance with the teachings of the subject invention.
Figure 6:
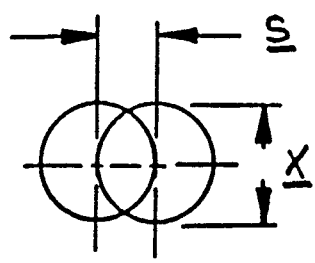
FIG. 6 is an enlarged, detailed diagrammatical view of the overlap between successive, individual weld spots in accordance with the subject invention.

With particular reference to FIGS. 5 and 6, yet another advantageous feature of the subject invention is exhibited. Although laser welding may be accomplished through use of a continuous laser beam it has been realized that spot welding is preferable. Pulsing the laser beam eliminates small blow holes in the weld bead. Pulsing the beam eliminates these small blow holes by overlapping the pulses by approximately 50% to 70%. The dimension s represents the amount of overlap, once again, based on the diameter of the laser beam. In effect, overlapping the pulses repairs any small blow holes that may be formed. Further, as indicated above, the depth or penetration of the weld through the steel layer can be closely controlled.

Use of a laser beam for welding has many advantages. No special joint configuration is required, especially when the above-noted parameters are utilized. As long as the laser beam is isolated from the bearing layer, improved results are achieved. Additionally, no filler material is utilized. Welding speeds ranging from 100 inches per minute to 1000 inches per minute are obtainable by the above-noted process. Thus, a reliable, integral structure is formed in an economical manner.

Figure 7:
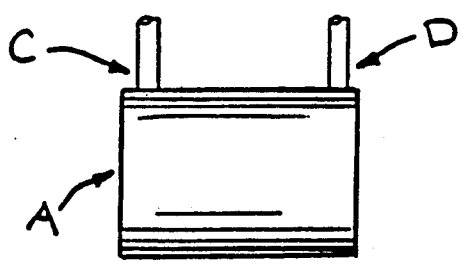
FIG. 7 generally illustrates a tempering step of the laser weld.

Post-process tempering may also directly follow the welding operation. With reference to FIG. 7, the laser beam weld C is illustrated as the initial welding process on the bushing. A second or tempering laser beam D may be utilized downline from the initial weld beam. The post-process tempering is accomplished either with a second, low power laser pass or by splitting the laser beam C and utilizing a segment to weld and a lesser segment D to temper. Although the tempering is desirable, it is not required.

Figure 8:
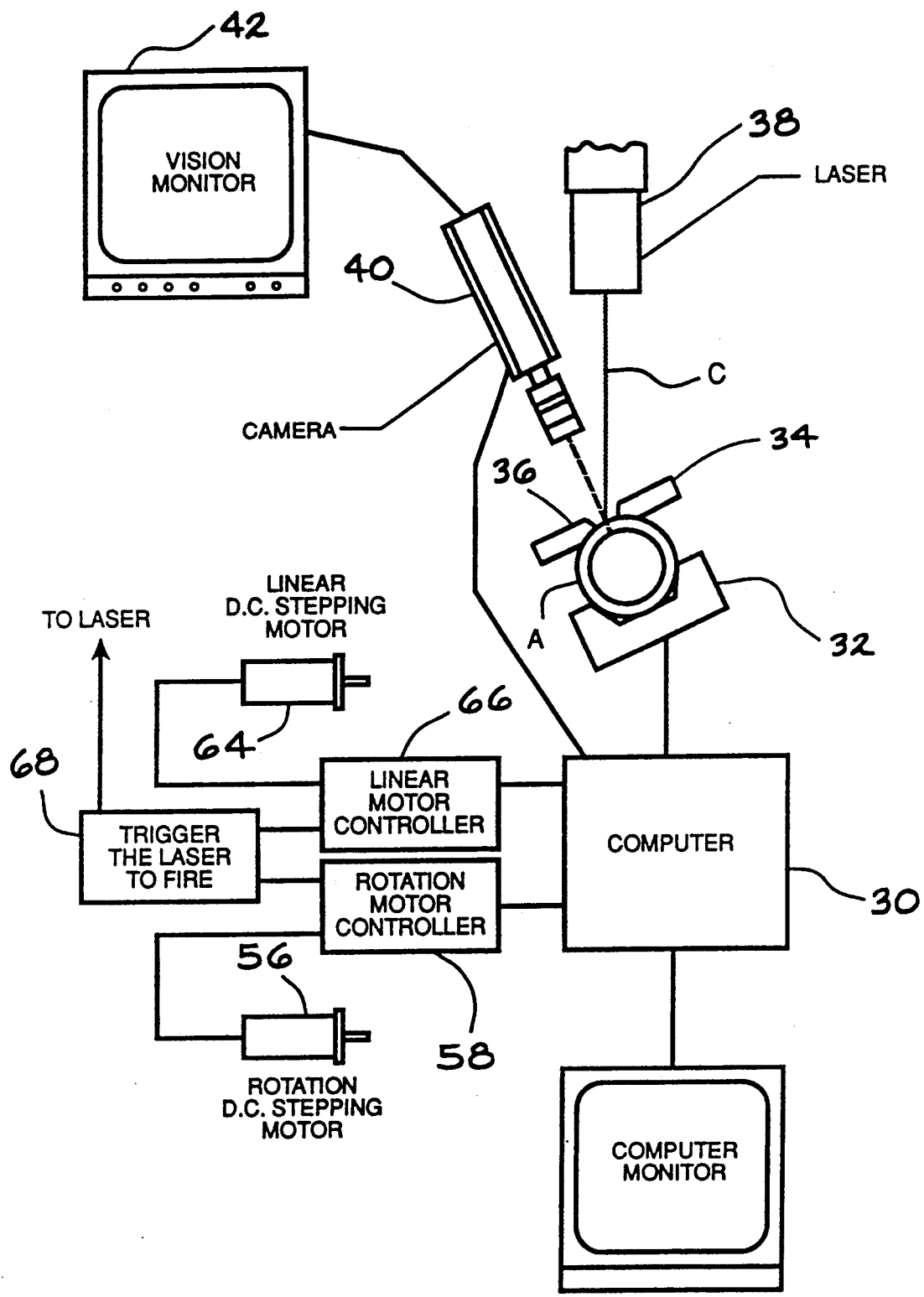
FIG. 8 is a schematic view of the machine vision control system.

The machine vision control system is shown schematically in FIG. 8 and includes a computer 30 at the heart of the control system. A three piece fixture clamp having members 32, 34 and 36 is used to hold the bushing A during welding by the laser 38. A camera 40 is positioned to view the surface of bushing A between the two clamp members 34 and 36. The output of camera 40 is received by the computer 30 and a monitor 42.

After the bushing A is positioned within the clamp and the clamp is actuated to secure the bushing, the machine vision control system proceeds automatically with the welding process.

Figure 9:
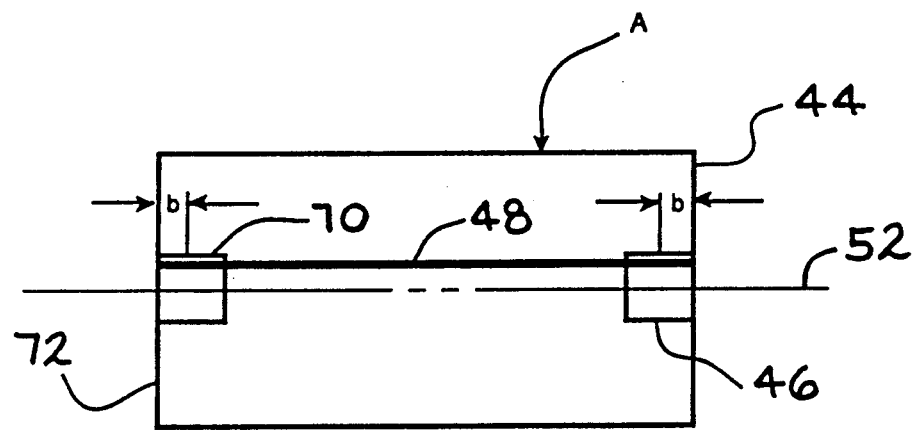
FIG. 9 is a plan view of a bushing as the opposing edges of the bushing are being located by the machine vision control system.
Figure 10:
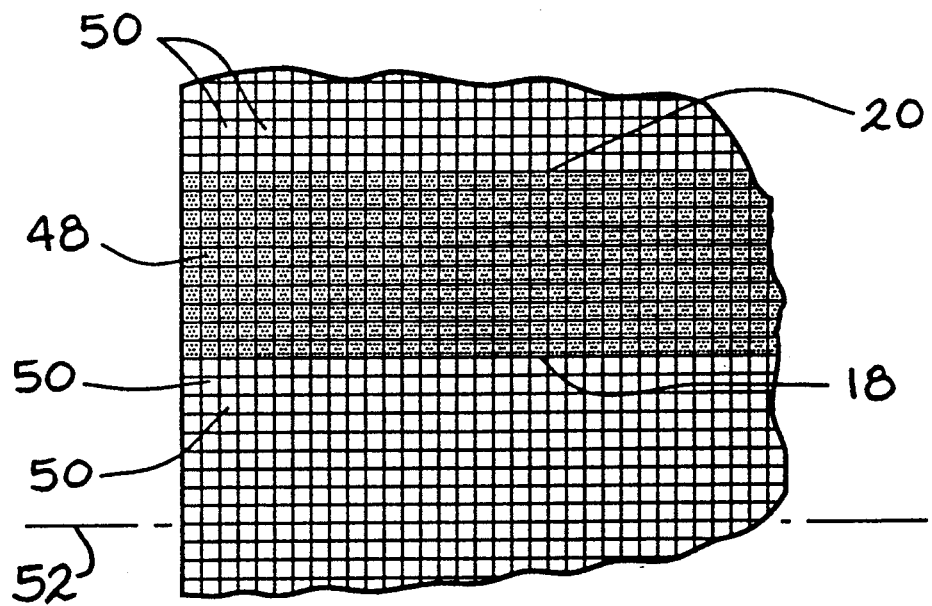
FIG. 10 is an enlarged schematic view of a portion of the boxed portion of FIG. 9 as viewed by the vision system during location of the opposing edges.

The system first takes a picture of a small portion of bushing A between clamp members 34 and 36 adjacent the leading longitudinal end 44 of the bushing. The box 46 shown in FIG. 9 represents the picture and is enlarged in FIG. 10. The computer analyzes the picture 46 to locate the seam or gap 48 between the two opposed edges 18, 20. The picture 46, as shown in FIG. 10, is divided into a number of rows and columns of pixels 50 for analysis by the vision system. The size of each pixel is on the order of one thousandth of an inch square.

To locate the gap 48, the vision system analyzes the picture by examining rows of pixels in an alternating fashion above and below the center line 52 of the picture. While alternating back and forth across the center line, the vision system is programmed to analyze every Nth row of pixels for a row which is darker than a predetermined value. The gap 48 between the opposing edges 18 and 20 will appear darker than the outer surface of the bushing. The computer is programmed with a comparison value for the bushing surface based on past experience for the reinforcing metal used in the bushing. It is possible to analyze every row, every second row, every sixth row, etc. however, experience has shown that by analyzing every fourth, the speed and accuracy of the search for gap 48 is maximized.

If the entire picture is examined and the gap is not found. The starting line of the search is offset by one pixel row and the search is repeated. The starting line is offset one pixel as many as N times if necessary so that every row of pixels will ultimately be examined in searching for the gap. If the gap is still not found, the vision system will produce a message to the operator indicating that a gap was not found, alerting the operator to either a defective part or improper placement of the part in the fixture clamp. The gap will typically be found without indexing the search starting line. The gap 48 is usually 10 to 20 pixels in width such that in searching every fourth row, the gap is usually found. The gap size could, however, be larger or smaller than 10–20 pixels.

When a pixel row is found which is darker than the program comparison value, the system searches rows on both sides of the dark row to determine the extent or width of the dark band formed by the gap 48. Once the width of a gap 48 is determined, the location of the gap center relative to the center of the picture can be determined. The vision system will then actuate a rotation stepping motor 56 through a rotation motor controller 58 to rotate the bushing and fixture clamp to position the gap 48 in the proper location relative to the laser beam C.

The picture 46 is taken at the leading end 44 of the part to locate the gap at the end. Typically, the weld does not extend from end to end of the bushing but a small distance b is left between the leading end 44 and trailing end 72 of the part and the beginning and end of the weld.

A linear stepping motor 64 is controlled by a linear motor controller 66 to longitudinally move the bushing A transversely across the path of the laser beam C during welding. It is typically assumed that the gap 48 is a straight line parallel to the center line of the bushing such that linear movement of the bushing past the laser beam will result in a straight weld along the gap 48. The weld sequence begins with initiation of the linear motor. Once the bushing has traveled the nonwelded distance including the distance b, the laser is triggered to begin the weld. The laser is programmed to operate while the linear motor moves the bushing A over the desired length of the weld. After welding, the laser is deactivated, the clamp opened and a part ejected. The linear and rotation motors are then returned to their home position to repeat the process with the next bushing.

If the edges 18, 20 are not cut square with the bushing A, i.e., if the edges are not parallel to the center line of the bushing, a second picture 70 of the bushing can be taken at the opposite or trailing end 72 of the bushing. The second picture 70 is analyzed in the same manner as the first fixture to locate the position of the gap 48 at the trailing end of the bushing. The rotational motor will then be operated simultaneously with the linear motor during the weld sequence to rotate bushing A as it is being moved linearly passed the laser beam. The rotation of the bushing assumes that the gap 48 is a straight line between the two ends of the bushing.

The laser is fired based on the longitudinal and rotational position of the bushing. The laser trigger 68 is controlled by the computer 30 based on the longitudinal and rotational position of the bushing.

The system computer is programmed with data relating to the bushing such as its diameter, width, the distance b at each end of the part which is not welded, the laser beam angle of incidence, etc. This information is used to position the bushing to produce the desired weld.

The machine vision control system thus automatically locates the bushing edges 18, 20 and positions the edges relative to the laser at the desired position and automatically performs the welding process. The system thus produces a precise, uniform and repeatable weld from bushing to bushing.

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

We claim:

1. A method of making a full round bushing comprising the steps of:
   supplying a hollow generally cylindrical member having an open longitudinal seam defined by opposed edges disposed in generally facing relation, said cylindrical member having at least first and second different metal layers in generally concentric relation, one of said layers defining a bearing surface;
   securing said cylindrical member in a fixture clamp;
   taking a picture of a predetermined portion of said cylindrical member, said portion including said seam;
   analyzing said picture to locate said seam;
   rotating said cylindrical member to position said seam at a predetermined location relative to a laser source; and
   laser welding said opposed edges to form an integral structure wherein said laser welding is essentially limited to the other of said metal layers such that said bearing surface is not degraded by said welding step.

2. The method as defined in claim 1 wherein said cylindrical member is welded by moving said cylindrical member longitudinally across a laser beam.

3. The method as defined in claim 1 wherein said picture is a first picture adjacent one longitudinal end of said cylindrical member and further comprising the steps of:
   taking a second picture of a portion of said cylindrical member adjacent the opposite longitudinal end including said seam;
   analyzing said second picture to locate said seam; and
   laser welding along a line defined by the location of the seam in said first and second pictures.

4. The method as defined in claim 1 wherein said laser welding step includes welding to a depth of approximately 20% to 75% of the radial thickness of said other of said metal layers.

5. The method as defined in claim 1 wherein said laser welding step includes welding to a depth of approximately 50% of the radial thickness of said other of said metal layers.

6. The method as defined in claim 1 wherein said laser welding step includes welding with a laser beam disposed at an angle to a radial plane defined between said opposed edges.

7. The method as defined in claim 1 wherein said laser welding step includes welding with a beam oriented at an angle approximating 10 degrees to 45 degrees to a radial plane defined between said opposed edges.

8. The method as defined in claim 1 wherein said laser welding step includes welding with a beam oriented at an angle approximating 20 degrees to 25 degrees to a radial plane defined between said opposed edges.

9. The method as defined in claim 1 wherein said laser welding step includes welding with a beam with its focal point offset from one of said edges a dimension approximating 5% to 70% of a spot diameter of the laser beam.

10. The method as defined in claim 1 wherein said laser welding step includes welding with a beam with its focal point offset from one of said edges a dimension approximating 10% to 30% of a diameter of the laser beam.

11. The method as defined in claim 1 wherein said laser welding step includes forming individual spot welds which are overlapped approximately 50% to 70% of the spot diameter of the laser beam.

12. The method as defined in claim 1 further including the step of post-weld tempering by laser.

13. A bushing made in accordance with the method of claim 5.

14. The method as defined in claim 1 wherein said laser welding step includes welding to a depth of approximately 20% to 75% of the radial thickness of said other of said metal layers, said laser beam being oriented at an angle approximately 10 degrees to 45 degrees to the radial plane defined between said opposing edges and wherein the focal point of said laser beam is offset from one of said edges a dimension approximately 5% to 70% of the spot diameter of said laser beam.

15. The method as defined in claim 14 wherein said laser welding step includes welding to a depth of approximately 50% of the radial thickness of said other of said second layer.

16. The method as defined in claim 14 wherein said laser welding step includes welding with a beam oriented at an angle approximating 20 degrees to 25 degrees to said radial plane.

17. The method as defined in claim 14 wherein said laser welding step includes welding with a beam with its focal point offset from one of said edges a dimension approximating 10% to 30% of a spot diameter of the laser beam.

18. The method as defined in claim 14 wherein said laser welding step includes forming individual spot welds which are overlapped approximately 50% to 70% of the spot diameter of said laser beam.

19. The method as defined in claim 1 wherein the step of analyzing said picture includes the steps of:
   dividing said picture into rows of pixels substantially parallel to said seam,
   examining said rows in a predetermined order looking for a row having an intensity darker than a predetermined intensity value; and
   after finding a darker row, searching rows on both sides of said darker row to determine the width of a darker band formed by said seam.

20. The method as defined in claim 19 wherein said predetermined order of examining said rows includes alternating between two halves of said picture a given number of rows from the center of said picture.

21. The method as defined in claim 20 wherein said given number of rows is four.

* * * * *